July 21, 1931.  J. F. MEDVECZKY  1,815,676
MEANS FOR WATERING FLOWERPOTS
Filed Sept. 16, 1930
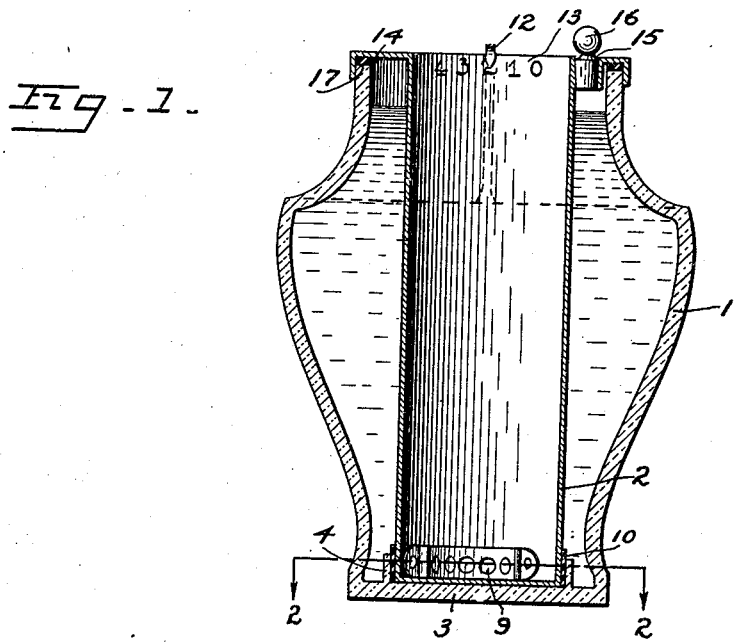
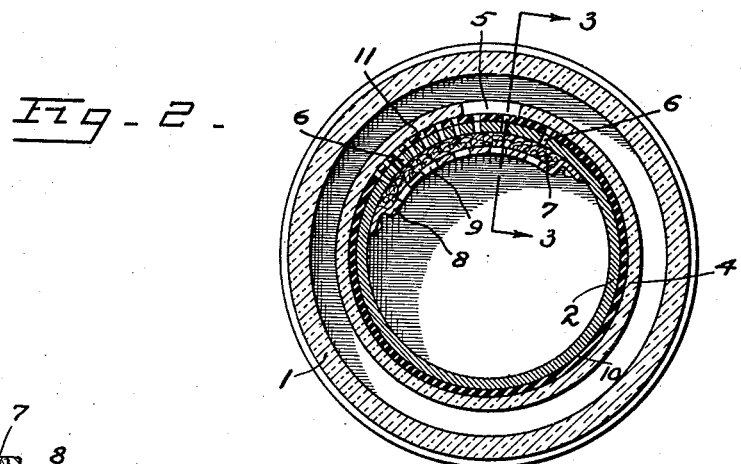
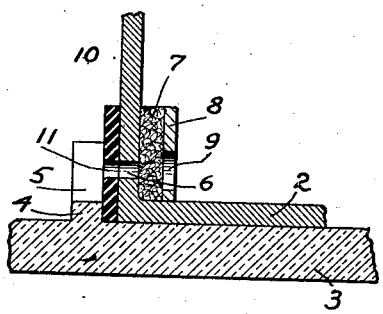
INVENTOR.
JULIUS F. MEDVECZKY
BY Munn & Co.
ATTORNEYS.

Patented July 21, 1931

1,815,676

UNITED STATES PATENT OFFICE

JULIUS F. MEDVECZKY, OF REDWOOD CITY, CALIFORNIA

MEANS FOR WATERING FLOWERPOTS

Application filed September 16, 1930. Serial No. 482,328.

My invention relates to improvements in means for watering flower pots, and it consists in the combinations, constructions and arrangements hereinafter described and claimed.

An object of my invention is to provide a means for watering flower pots which is designed to hold a large quantity of water and to gradually feed this water into the flower pot in accordance with the demands of the plant, the feeding means being controlled so as to vary the quantity of water passing into the flower pot in a given time period.

A further object of my invention is to provide a device of the type described in which novel means is provided for permitting water to enter the flower pot and for preventing the passing of soil from the flower pot out into the water.

The device for holding the water entirely encloses the flower pot, and the external appearance of the device can be shaped and colored so as to have an esthetic appeal.

Other objects and advantages will appear as the specification proceeds, and the novel features of the device will be particularly pointed out in the claims hereto annexed.

My invention is illustrated in the accompanying drawings, in which:

Figure 1 is a vertical section through the device,

Figure 2 is a section along the line 2—2 of Figure 1, and

Figure 3 is a section along the line 3—3 of Figure 2.

In its preferred form my device is comprised of an outer vessel 1 which may be of any form desired, and an inner vessel 2 rotatably mounted in it. The latter serves as a container for earth (not shown).

First I shall describe how water flows from the outer vessel 1 into the inner vessel 2 for the purpose of watering the plant. The bottom portion of the inner vessel 2 is rotatably mounted in a circular flange 4 projecting from the bottom 3 of the outer vessel 1. The flange 4 is provided with a recess 5 as shown in Figures 2 and 3. Perforations 6 in the lower portion of the vessel 2 are so arranged that a certain number of them, one, two, three, and so forth, can register with the recess 5 when the vessel 2 is rotated into the desired position as will be hereinafter described.

Inside of the vessel 2 I place a layer of asbestos 7 or other suitable fibrous material which covers the perforations 6 and prevents dirt from passing through the openings 6 into the water. This fibrous material is held in place by a member 8. The member 8 has a number of perforations 9 to facilitate the passage of water into the vessel 2. A circular rubber washer 10 is tightly set on the vessel 2 and is provided with perforations 11 which register with the perforations 6 of the vessel 2.

From the foregoing description it is to be understood that water flows through the recess 5, the perforations 11 and 6 in the washer 10 and the vessel 2 respectively, then through the layer of asbestos 7 and the perforations 9 in the member 8.

Now I shall describe how the flow of water can be adjusted, and also how an indicator is used for designating the quantity of water passing into the vessel 2 at any one time.

As I mentioned previously, a certain number of perforations 6 may be registered with the recess 5 of the circular flange 4. The flow of water is in proportion to the number of perforations. The more perforations 6 that register with the recess 5, the bigger is the flow of water. So if it is desired to produce a bigger flow, the inner vessel 2 has to be rotated by hand in a clockwise direction until the desired number of perforations 6 register with the recess 5. When the opposite result is desired, the vessel 2 has to be rotated in the opposite direction.

To show what number of the perforations 6 register with the recess 5, I provide an indicator 12 which is attached to the outer vessel 1. On the inner upper portion of the vessel 2 I place numbers 0, 1, 2, 3, 4, and so forth, indicated by the reference numeral 13. The numbers 13 are so located that when the indicator 12 coincides with a certain number, the same number of the perforations 6 registers with the recess 5.

The upper portion of the vessel 2 forms a cover 14 over the vessel 1. The outer vessel 1 may be filled with water through an aperture 15 having a removable cork 16.

I prefer to place a rubber washer 17 between the vessel 1 and the cover 14 to make the whole device watertight.

Although I have shown and described one embodiment of my invention, it is to be understood that the same is susceptible of various changes, and I reserve the right to employ such changes as may come within the scope of the claims hereto attached.

I claim:

1. In combination, an inner earth-holding member having openings therein, an outer water-holding member having a portion covering the openings, said portion having a recess designed to register with the openings, the inner member being rotatable with respect to the outer member for bringing the recess in registration with the openings.

2. In combination, an inner earth-holding member having openings therein, an outer water-holding member having a portion covering the openings, said portion having a recess designed to register with the openings, the inner member being rotatable with respect to the outer member for bringing the recess in registration with the openings, and a porous material covering the openings for permitting water to pass therethrough but preventing the passage of earth therethrough.

3. In combination, an inner earth-holding member, an outer liquid-holding member, said earth-holding member having openings therein, means carried by the water-holding member for uncovering one or more of the openings, and an indicator for showing the number of openings uncovered at any given time.

4. In combination, an inner earth-holding member, an outer liquid-holding member, said earth-holding member having openings therein, means carried by the water-holding member for uncovering one or more of the openings, an indicator for showing the number of openings uncovered at any given time, and a porous material covering the openings for permitting water to pass therethrough but preventing the passage of earth therethrough.

5. In combination, a flower pot having openings near its bottom and a flanged top, a water container normally covering the openings, said flange having a recess therein for uncovering the openings, said openings being spaced at progressively diminishing distances from each other so as to bring one or more openings into registration with the recess, and an indicator showing the number of openings registering with the recess.

6. In combination, a flower pot having openings near its bottom and a flanged top, a water container normally covering the openings, said flange having a recess therein for uncovering the openings, said openings being spaced at progressively diminishing distances from each other so as to bring one or more openings into registration with the recess, an indicator showing the number of openings registering with the recess, and a porous material covering the openings for permitting water to pass therethrough but preventing the passage of earth therethrough.

7. In combination, a flower pot having openings near its bottom and a flanged top, a water container normally covering the openings, said flange having a recess therein for uncovering the openings, said openings being spaced at progressively diminishing distances from each other so as to bring one or more openings into registration with the recess, an indicator showing the number of openings registering with the recess, and a rubber ring disposed between the flower pot and the flange and being secured to the flower pot so as to rotate therewith, said ring having openings registering with the openings in the flower pot.

8. A flower pot comprising an outer vessel for containing water and an inner vessel for containing earth, said inner vessel having a number of perforations, means for allowing water to pass through a certain number of perforations at a time, and means for indicating the flow of water.

JULIUS F. MEDVECZKY.